United States Patent
Emma et al.

(10) Patent No.: US 7,337,271 B2
(45) Date of Patent: Feb. 26, 2008

(54) CONTEXT LOOK AHEAD STORAGE STRUCTURES

(75) Inventors: Philip George Emma, Danbury, CT (US); Allan Mark Hartstein, Chappaqua, NY (US); Brian R. Prasky, Wappingers Falls, NY (US); Thomas Roberts Puzak, Ridgefield, CT (US); Moinuddin Khalil Ahmed Qureshi, Austin, TX (US); Vijayalakshmi Srinivasan, New York, NY (US)

(73) Assignee: International Business Machines Corporation, Armonk, NY (US)

( * ) Notice: Subject to any disclaimer, the term of this patent is extended or adjusted under 35 U.S.C. 154(b) by 509 days.

(21) Appl. No.: 10/724,815

(22) Filed: Dec. 1, 2003

(65) Prior Publication Data

US 2005/0120193 A1    Jun. 2, 2005

(51) Int. Cl.
G06F 12/00 (2006.01)
G06F 9/00 (2006.01)

(52) U.S. Cl. ............... 711/117; 711/118; 711/119; 711/122; 712/240; 712/239; 712/238

(58) Field of Classification Search ............... 711/117, 711/118, 119, 122; 712/240, 239, 238, 237
See application file for complete search history.

(56) References Cited

U.S. PATENT DOCUMENTS

| 4,679,141 | A | * | 7/1987 | Pomerene et al. | .......... 712/240 |
| 5,163,140 | A | | 11/1992 | Stiles et al. | |
| 5,327,547 | A | | 7/1994 | Stiles et al. | |
| 5,515,518 | A | | 5/1996 | Stiles et al. | |
| 5,584,001 | A | | 12/1996 | Hoyt et al. | |
| 5,875,325 | A | | 2/1999 | Talcott | |
| 6,067,616 | A | | 5/2000 | Stiles et al. | |
| 6,427,192 | B1 | | 7/2002 | Roberts | |
| 7,024,545 | B1 | * | 4/2006 | Zuraski et al. | ............. 712/240 |

FOREIGN PATENT DOCUMENTS

JP          03063726 A     *   3/1991

OTHER PUBLICATIONS

Alan Jay Smith; Cache Memories; ACM Computing Surveys Surveys; Sep. 1982; pp. 473-530; vol. 14, No. 3; Computing Surveys; US.

\* cited by examiner

Primary Examiner—Kimberly McLean
(74) Attorney, Agent, or Firm—Keusey, Tutunjian & Bitetto, P.C.; Brian P. Verminski, Esq.

(57) ABSTRACT

A memory storage structure includes a memory storage device, and a first meta-structure having a first size and operating at a first speed. The first speed is faster than a second speed for storing meta-information based on information stored in a memory. A second meta-structure is hierarchically associated with the first meta-structure. The second meta-structure has a second size larger than the first size and operates at the second speed such that faster and more accurate prefetching is provided by coaction of the first and second meta-structures. A method is provided to assemble the meta-information in the first meta-structure and copy this information to the second meta-structure, and prefetching the stored information from the second meta-structure to the first meta-structure ahead of its use.

36 Claims, 15 Drawing Sheets

Branch History Table - 201

| Branch Instruction Address - 202 | Target Address of Branch - 204 |
|---|---|
| | |
| | |
| | |
| | |
| | |
| | |
| | |

FIG.3

Predicted Branch Table - 250

| Instruction Address Of Next Taken Branch (Predicted) - 252 | Target Address Of Next Taken Branch (Predicted) - 254 |
|---|---|
|  |  |
|  |  |
|  |  |
|  |  |

FIG.5

BA1, BA2, BA3, and B4 are distinct and in program order

CONTEXT LOOK AHEAD STORAGE STRUCTURES

BACKGROUND OF THE INVENTION

1. Field of the Invention

The present invention relates to data processing, and more particularly to prefetching of branch and other Meta information between hierarchical storage levels.

2. Description of the Related Art

In most high performance processors, pipelining is used as a means to improve performance. Pipelining allows a processor to be divided into separate components where each component is responsible for completing a portion of an instruction's execution.

Referring to FIG. 1A, an illustration of the major components that make up a typical processor's pipeline 10 are shown. The components include an instruction fetch (stage I), instruction decode (stage II), address generation (stage III), operand fetch (stage IV), instruction execution (stage V), and store results (stage VI). Each instruction enters the pipeline and ideally spends one cycle at each pipeline stage. Assuming that each stage of the pipeline takes one cycle to complete, each instruction needs six cycles to pass through the pipeline. However, if the pipeline can be kept full, then each pipeline stage can be kept active, working on a different instruction, each at a different stage.

Hence, one instruction can be completed every cycle. Unfortunately, keeping the pipeline full and processing an instruction in one cycle for every stage of the pipeline is not easy. Pipeline stalls occur due to control flow dependencies, data dependencies, or instructions requiring multiple cycles to pass through a single pipeline stage. These stalls result in a performance loss.

To limit such performance losses, processors rely on two techniques, namely, caching and speculation.

By virtue of locality, a small structure can be used to retain information stored in a high latency, large structure if the information is used frequently. This "cached" information can then be accessed at the cost of accessing the smaller structure most of the time. The figure of merit of such structures, namely the hit rate, is the probability with which the information can be accessed in the smaller structure. If the hit rate of a locality based structure is high, then the average time spent in accessing the large structure is almost the same as accessing the small structure. By virtue of speculation, a hardware structure can be used to guess an unpredictable outcome of the program flow and can allow the processing of the instruction to continue. In case the guess is wrong, the instruction is processed again. The prediction rate determines the success of these structures and is the probability with which the structure can predict the outcome correctly. If the prediction rate is high then the performance lost due to uncertainty is minimized.

Such structures, which store information, which helps in processing the instruction faster, are called Meta-structures and the stored information is called Meta-information.

Referring to FIG. 1B, a functional block diagram of a pipeline 10 with Meta-structures is shown. These Meta-structures, for example, a translation look aside buffer (TLB), branch predictor, branch target buffer (branch history table (BHT)), cluster predictor, value predictor, address generation interlock (AGI) predictor, operand store compare predictor (OSC), etc., reduce the number of cycles spent in pipeline stalls.

The hit rate/prediction rate of the Meta-structures depends on their size. A larger structure (table) provides a better hit rate and increases performance. However by increasing table size, the access time of the structure is increased and performance is degraded.

The branch prediction mechanism used by a processor exhibits these properties. For example, a larger branch history table has a higher branch prediction rate, and performance increases. However, a larger branch history table requires more time for each access. Increasing the access time of a BHT increases branch error penalties and performance is lost. Thus, it is desirable for the BHT to have a fast access time (characteristic of a small table) and still have a very high branch prediction rate (characteristic of a large table).

One aspect of the present invention includes providing both of these features necessary for increased performance, for example, a branch prediction mechanism that delivers a fast access time while still achieving a very high branch prediction rate characteristic of a large table.

SUMMARY OF THE INVENTION

As technology advances, routing delays are increasing. The demands of storing only the most important and relevant information in the critical area of the chip and moving the rest of the information to a secondary storage, located away from the critical high frequency area are needed for high performance. However, having bigger Meta-structures affects performance adversely by increasing the routing delays for other structures or processing elements.

As these structures become larger, the contrasting requirement of having a high hit rate as well as reduced access latency gives rise to arranging the structure hierarchically and prefetching from the bigger table to the smaller table. For effective prefetching, a scheme is provided that can identify the relevant information at the higher level and transfer the information ahead of its use to the first level.

A branch history table or branch target buffer are used to remember actions (either taken or not-taken) and target addresses of previously encountered branches in a branch prediction method. The accuracy of the branch prediction mechanism largely depends on the size of the branch history table.

Sizes of the branch history table may include 16 k to 32 k branch entries. If each entry includes, for example, two four-byte address fields (representing the branch address and target address) then a branch history table (BHT) would include 128 k to 256 k bytes of information. Branch prediction accuracy could be improved if the BHT could be made larger. However, the table hardware needs to be packaged in the speed critical instruction fetch and branch prediction area of the machine.

A technique is described to prefetch branch and other Meta-information from a high level memory area to a lower-level memory area. The Meta-information is prefetched ahead in time of its normal use by the processor. This feature may be used to make the lower-level memory area small and fast, without impacting the accuracy of the structure significantly.

According to an aspect of the present invention, Meta-information is defined as the information that aids in processing the instruction faster, and can be correlated to the control flow of the program. Meta-structures, the storage structures which store meta-information, may include access patterns that very strongly correlate with the program control flow. "Context Look Ahead" information may be identified for the Meta-information. Context Look Ahead information is arranged on a level 1 (L1) cache line basis and includes temporally sequential Meta-information starting with the Meta-information of corresponding L1 line address.

According to another aspect of the present invention, unique Meta-information entries may be stored in a Look-Ahead-Context (LAC) and are ordered with respect to time. The number of entries of Meta-information that can be stored in the LAC may be determined by the "Look-Ahead-Context Depth".

A method for prefetching branch and other Meta-information from a higher level memory area to a lower-level memory area for a processor having a multistage execution pipeline is also provided.

A Meta-Collector circuit collects the Look Ahead Context information. The circuit collects temporally and spatially sequential unique Meta-information entries corresponding to a cache line. The LAC information may be stored in the L1 cache when the Look Ahead Context (LAC) Depth is reached or when an entry is replaced from the Meta-Collector. The LAC information for a given L1 cache line may be evicted from the L1 cache when the corresponding cache line is replaced. This LAC can then be stored to a second level memory area or the Level 2 cache. On a L1 cache miss, the LAC corresponding to the L1 miss address may be written to the lower level memory area.

A method for processing a temporal sequence of events, wherein the events have spatial context is provided. The method includes capturing a set of addresses in temporal order, the addresses including information associated with each address, for example, meta-information. Sub-sequences of temporal addresses which share spatial context are stored as monolithic entities wherein each monolithic entity is associated with a particular spatial context. When a new spatial context is encountered in the temporal sequence, a new monolithic entity is created and associated with the new spatial context. The new spatial context includes the temporal sub-sequence of events associated with the new spatial context.

In other methods, the step of storing the monolithic entities associated with the spatial contexts in their temporal order of occurrence may be included. The monolithic entities may include multi-dimensional data, which may include a spatial dimension, a temporal dimension and/or metadata. The step of storing the monolithic entities at a location determined by spatial context or temporal context of the monolithic entities may be included.

The method may further include retrieving monolithic entities from storage in accordance with spatial content of the said monolithic entities and may include using metadata associated with the monolithic entities by a processor after the monolithic entities are retrieved. The method may further include retrieving monolithic entities from storage in accordance with temporal content of the said monolithic entities, and may include using metadata associated with the monolithic entities by a processor after the monolithic entities are retrieved.

These and other objects, features and advantages of the present invention will become apparent from the following detailed description of illustrative embodiments thereof, which is to be read in connection with the accompanying drawings.

BRIEF DESCRIPTION OF DRAWINGS

The invention will be described in detail in the following description of preferred embodiments with reference to the following figures wherein:

FIG. 3 illustratively shows a structure for a Branch History Table (BHT);

FIG. 5 illustratively shows a structure for a Predicted Branch Table (PBT);

DETAILED DESCRIPTION OF PREFERRED EMBODIMENTS

Figure 1A:
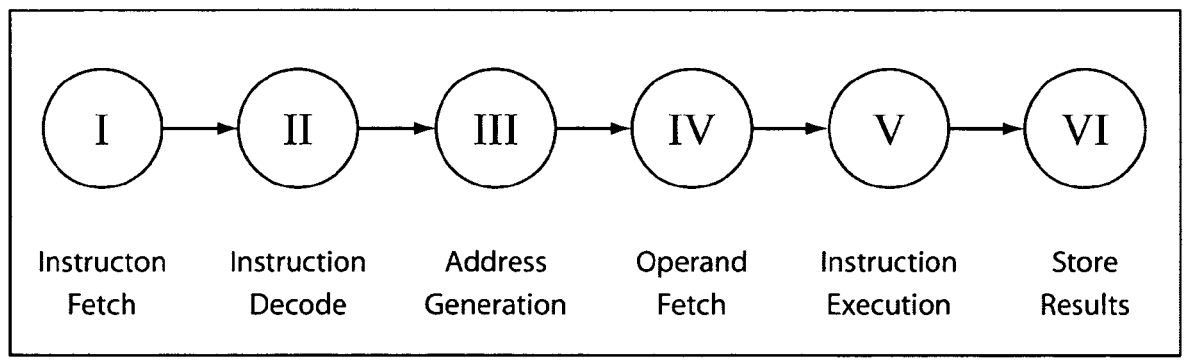
FIG. 1A is a representation of a pipelined processor.
Figure 1B:
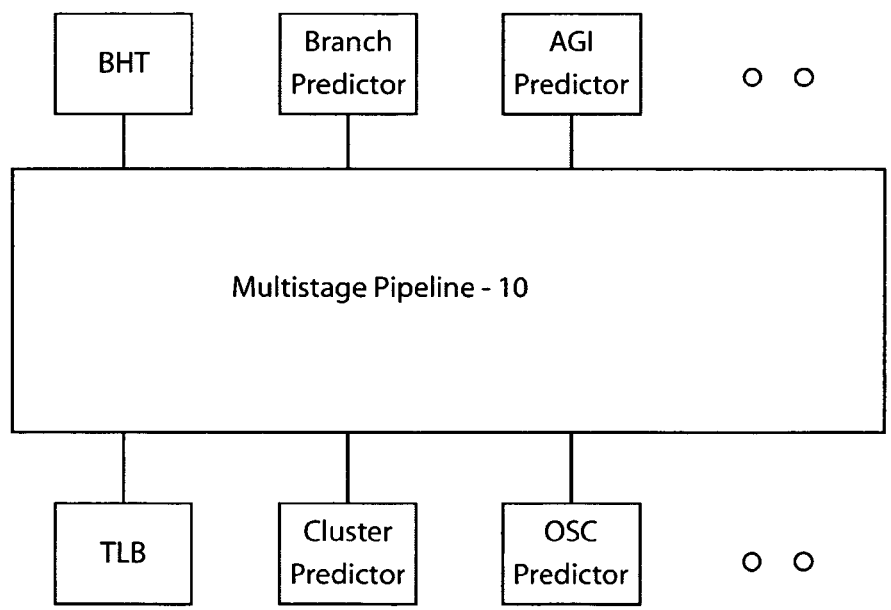
FIG. 1B is a representation of a pipelined processor with Meta-structures.

The present invention is directed to improving data flow in data processing systems. One aspect of the present invention includes a Context Look Ahead Branch History Table (BHT), which does not add hardware to a critical data flow path and, in fact, reduces the amount of hardware in the critical path. For purposes of illustrating the present invention, an analogy can be drawn to the relationship between a cache and main memory. Increasing the cache size is usually desirable, but not always practical because of limitations in chip area and cycle time restrictions. Instead of increasing the cache size, a second level cache (L2) may be added to the memory hierarchy to improve performance.

Unlike caches, the transfer from a second level BHT to a first level BHT needs to be performed in advance of its use. A cache like on-demand transfer from the second level BHT to the first level BHT is not sufficient to insure timely arrival of data. All branch prediction information saved in the second level of the BHT should be transferred to the first or lower level of the BHT in advance of the branch's prediction to ensure a high branch prediction rate.

Unnecessary pipeline stalls can occur if a branch prediction is delayed waiting for branch prediction information to arrive from the second level BHT. Additionally, predicting a branch's outcome without all pertinent information (saved in the first and second level of the BHT) will only decrease the prediction accuracy of the BHT and result in a performance loss. Thus, the transfer of information from the second level to the first level needs to be done far enough ahead in time of its use. This can be done with the "Look Ahead Context" technique (LAC) (or Context Look Ahead (CLA)), in accordance with one aspect of the present invention.

Context Look Ahead Storage Structures (CLASS) provides a mechanism to store Meta-information hierarchically and prefetch the relevant information from a larger table (BHT) to a smaller table (BHT) in a timely manner. The prefetch from the second level table to the first level table is done in a fixed size quantum called as Look Ahead Context (LAC).

"Look Ahead Context" is a fixed sized snapshot of the spatially and temporally sequential Meta-information that is likely to be used in the near future. CLASS is universal and can be applied to any Meta-structure as long as accesses to the structure are correlated to the program control flow. For the purpose of explaining the working of CLASS and to compare it with prior art schemes, the present disclosure will illustratively employ the Branch History Table (also called a Branch Target Buffer) as an example Meta-structure. Other structures are also contemplated for use with the present invention.

It should be understood that the elements shown in the FIGS. may be implemented in various forms of hardware, software or combinations thereof. Preferably, these elements are implemented in software on one or more appropriately programmed general-purpose digital processor devices or computers having a processor and memory and input/output interfaces. Referring now to the drawings in which like numerals represent the same or similar elements and initially to FIG. 2, components of a decoupled instruction fetch engine 100 for a high performance processor are illustratively shown. For description purposes only, FIG. 2 emphasizes instruction (istn) fetching and branch prediction portions of a processor and de-emphasizes or omits many other features necessary for a complete design. Main memory 103 includes instructions and operands of programs executing on the processor. Instructions and operands are fetched from main memory 103 and stored in caches 102 and 101. Each fetch specifies a 'line' of memory, where a line represents a fixed size block of information transferred between the cache 101 and 102. A memory line size may range from 128 to 256 bytes.

As shown, the cache 101 is a unified cache holding both instructions and operands. There are two caches, one for instructions and one for data (operands). This is commonly called a split cache. A more detailed description of the structure and cache 101 may be found in A. J. Smith "Cache Memories", Computing Surveys, vol. 14 no. 3, Sep. 1982, pp. 473-530, incorporated herein by reference.

Instructions are staged from the cache 101 into an instruction buffer (IB) 119. The IB 119 holds the next N instructions in sequence following the one currently being decoded. Values for N may be, e.g., 8 or 16. Instructions can be fetched from the cache individually. However, it may be desirable to fetch instructions from the cache in blocks where a block is 8 to 16 bytes wide and the address of each block fetched is adjusted to an 8 or 16 byte boundary depending on the width of the block fetched.

Instructions are transferred from the instruction buffer (IB) 119 to a decode stage 2 of the pipeline. The decoded instruction is sent to an address generation stage 3 to perform any needed operand address calculations and verifies (when possible) that the branch prediction mechanism 200 and instruction fetch mechanism 400 have correctly predicted the actions of any encountered branches.

Operand address information of the instruction (if any) is calculated and sent to an operand fetch stage 4 to request the data from the cache 101. If the instruction just decoded is a branch, the decode information and address generation information (target of the branch) are sent to the branch prediction mechanism 200 and instruction fetch mechanism 400. These units can then detect if a misprediction has occurred. This process will be described more fully below.

After an operand fetch has been requested, the execution information is sent to an execution unit 5 where the instruction will be held until any needed data is returned from the cache 101. When the needed data is available, the execution of the instruction is completed and the results are written back as needed by the particular instruction.

An Endop (end of operation) function or signal 6 is issued to mark the point in time when the instruction is successfully completed (e.g., store results). The branch prediction mechanism 200 uses a Branch History Table (BHT) to predict the outcome of a branch; either taken or not taken. The branch prediction mechanism 200 is initially given a starting address in an instruction stream and searches the BHT to identify the next taken branch that will be encountered by the processor.

A more detailed description of the structure and operations may be found is U.S. Pat. No. 4,679,141 incorporated herein by reference. The predicted taken branch found by the branch prediction mechanism is used to guide the instruction fetching mechanism 400.

Although it is quite accurate, the branch prediction mechanism can incur prediction errors from time to time. Branch prediction errors can be detected at three points in the pipeline. First, a branch prediction error can be detected after the decode phase of an instruction. If an unconditional branch is decoded and the branch prediction mechanism failed to predict a branch at the instruction's address then a prediction error has occurred. When this happens, the instruction fetch mechanism 400 and branch prediction mechanism 200 are signaled that a branch prediction error has occurred via reset path 181. The branch prediction mechanism 200 will then begin a new branch prediction sequence of instructions using the target address of the branch just decoded as the new starting address. Similarly, the instruction fetching mechanism 400 will begin fetching instructions from the target address of the branch just decoded.

Second, whenever a branch is decoded, an error in the predicted target address can be detected early, after the branch target address has been generated. Here, the predicted target address of the branch prediction mechanism is compared against the target address of the branch at the end of the address generation phase. If the addresses do not match, a branch prediction error has occurred and the branch prediction mechanism 200 and the instruction fetching mechanism 400 are signaled via path 181 and a new sequence of predictions and instruction fetches can begin.

Third, a taken or not-taken prediction error can be detected at the end of instruction execution. For example, if the branch prediction mechanism 400 predicts that a branch will be taken, and at the end of execution, the branch is not taken then an error has occurred. Similarly, a prediction error occurs when the branch prediction mechanism 400 predicts a branch is not-taken, and it is taken at the end of execution. If the action of the branch does not match the predicted action of the branch prediction mechanism 400 then the instruction fetch mechanism 200 and branch prediction mechanism 400 are restarted. These units are signaled via BHT update path 191 that a prediction error has occurred and begin a new prediction sequence and instruction fetch sequence at the correct instruction following the branch.

In the FIGS., BHT.PC is the BHT's program counter, this is the instruction address (or search address) that is being sent to the BHT. The IF.PC is the instruction fetch program counter. This is the current address being used for instruction fetching.

Referring to FIG. 3, structure for a Branch History Table 201 is illustratively shown. For simplicity, it is assumed that each entry in a branch history table (BHT) 201 includes two fields:

1. The address of a branch instruction 202; and
2. The predicted target address 204 associated with the branch identified in branch instruction 202.

Any entry in a BHT represents a branch address and target address of a branch that was previously taken. The BHT 201 only includes information on branches that were taken at least once. These two fields will be referred to collectively as a BHT entry, and include a branch address (BA) and predicted target address (TA), respectively, which can be represented as the ordered pair <BA,TA>. A single <BA, TA> entry captures one branch prediction entry in the BHT. More than one <BA,TA> entry may be assembled into a larger LAC to form a monolithic entry that captures many <BA,TA> entries and is associated with a line in the cache. The individual <BA,TA> entries represent the spatial and temporal characteristics of the LAC. The monolithic entry may be two or more <BA,TA> pairs (or larger ordered structures) in the LAC that is associated with a line in the cache. For example, the ordered pair may include two or more entries (of <BA,TA> pairs>) which may be referred to generally as a monolithic entity.

Spatial context refers to the relevant machine state (information) that is saved as history for future use. The information is spatial in that it is in the same cache line as the other information saved. A temporal context refers to state (information) that will be referenced again in a short amount of time.

In practice, it is desirable to find (predict) taken branches early enough so that the instruction fetching mechanism 400 can fetch instructions before they are needed, so that no delay will occur in the pipeline. This condition is usually not met if the target of the branch is fetched only after the branch is located and identified. Therefore, the branch prediction mechanism 200 is usually organized and addressed on the basis of a 'branch prediction block'.

For the branch prediction mechanism 200 to be further ahead (in time) than the instruction fetching mechanism 400, it is desirable for the branch prediction block 200 to be larger than the instructions fetching block 400. For example, the branch prediction mechanism 200 may be organized to search for branches within a 32 byte block, while the instruction fetching mechanism may issue fetches on a 16 byte basis. Thus, assuming only one search or fetch can occur per cycle, the branch prediction mechanism 200 can be twice as far ahead (in time and distance) as the instruction fetching mechanism 400.

Figure 4:
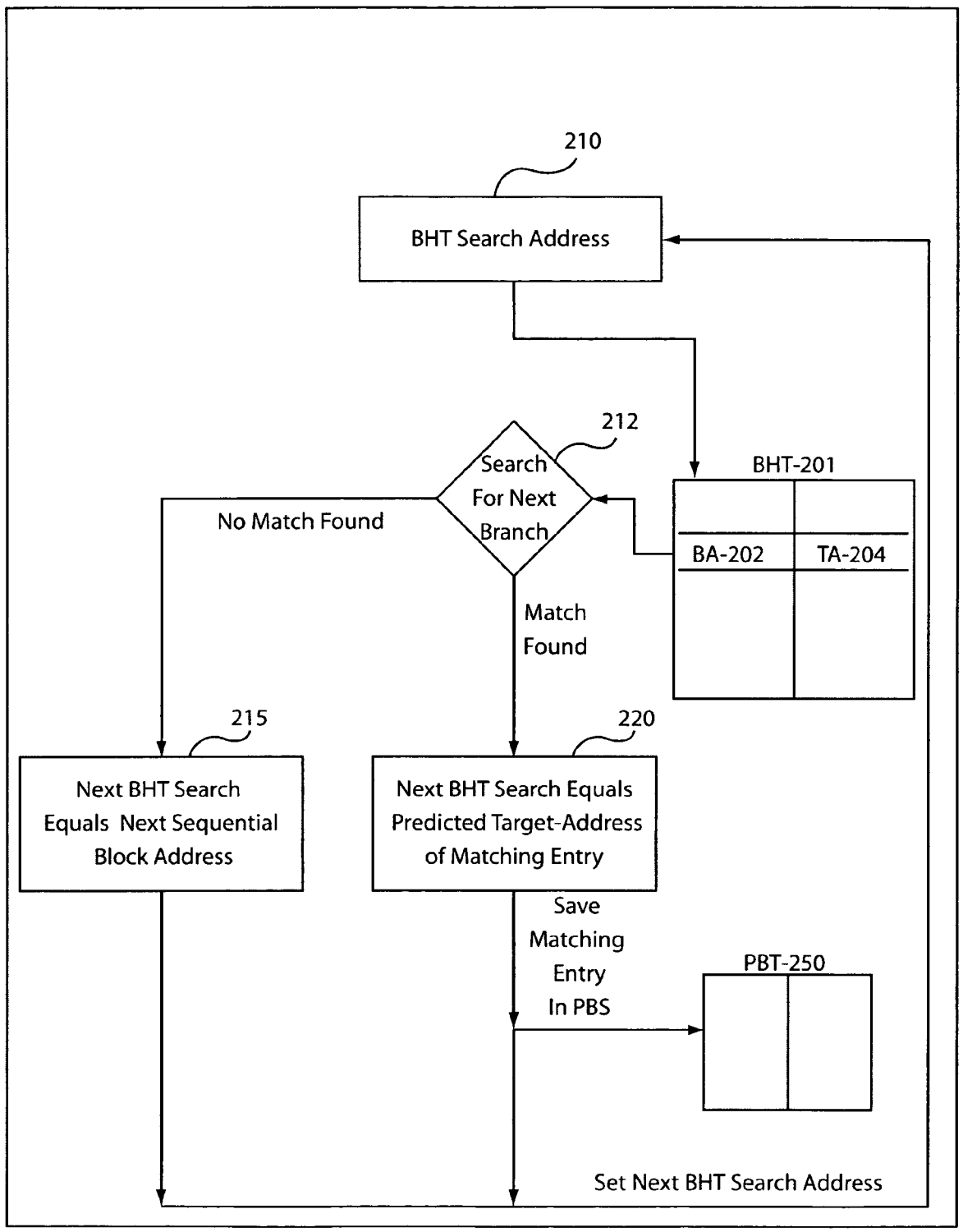
FIG. 4 is a functional block diagram of a branch prediction mechanism used by a processor.
Figure 6:
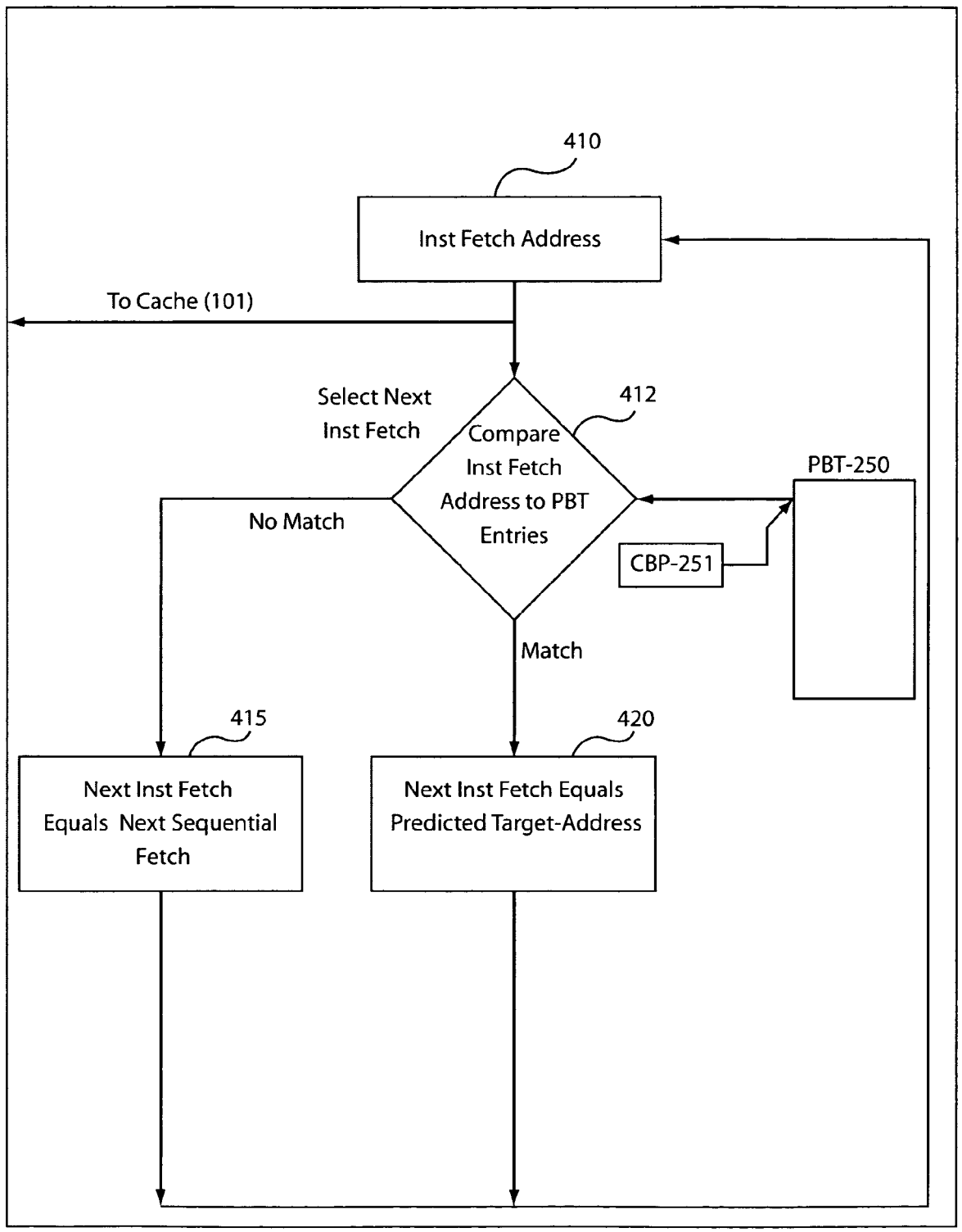
FIG. 6 is a functional block diagram of an instruction fetching mechanism used by a processor.

As mentioned above, the BHT 201 predicts the next taken branch that will be encountered by the processor in advance of when the instructions are fetched from the cache (101 or 102). Note, when working properly, the BHT 201 is predicting the outcome of a branch even before the instructions are fetched from the cache, and therefore before the decoder 2 has determined that there is, in fact, a branch at that location. FIGS. 4-6 describe this process in greater detail.

Referring to FIG. 4, actions of the branch prediction mechanism 200 are illustratively shown. The branch prediction mechanism 200 predicts an immediate sequence (path) of instructions the processor will encounter (execute). The branch prediction mechanism 200 searches the BHT 201 to discover a sequence of taken branches that the processor will soon encounter and guides the instruction fetching mechanism 400 (FIG. 2) through the correct sequence of instruction fetches that will be needed by the processor in the near future. Note, the sequence of predicted taken branches will be used to load the instruction buffer 119 (FIG. 2) with a sequence of instructions, whether next sequential or jumps to the targets of predicted branches.

The BHT 201 is searched using a BHT Search Address 210. An initial BHT search address 210 is supplied to the branch prediction mechanism 200 from the execution 5, decode 2, or address generation 3 unit (FIG. 2) after a branch wrong guess signal is detected. Then, the BHT 201 is searched using this address. The BHT search address 210 is compared against the branch address (BA) 202 fields included in the BHT 201. A match/no-match signal is examined using compare logic 212. If a BHT search address 210 misses all BHT entries, then the next BHT search address is updated to equal the 'next-sequential' block via path 215. For example, if the last BHT search address was 1000 and the BHT search block width is 32 bytes, then the next BHT search address is 1032.

If the BHT search address 210 'hits in the BHT' then branch prediction mechanism 200 is redirected to reflect the jump in the instruction stream predicted by the BHT entry. The matching BHT entry (predicted branch address 202 and target address 204 of the next predicted taken branch) is sent to the Predicted Branch Table 250 (PBT) via path 220. The matching BHT entry is then saved in the PBT 250 and the next BHT search address is set equal to the predicted target address of the matching BHT entry.

Referring to FIG. 5, a format for the Predicted Branch Table 250 is illustratively shown. Each entry in the PBT 250 is a BHT 201 entry. The entries in the PBT 250 identify a sequence of predicted taken branches that the processor will soon encounter. Each entry in the PBT 250 includes two fields:

1. An address of the next predicted branch 252 that will be taken; and
2. A target address 254 of the predicted branch associated with the branch identified in the next predicted branch 252.

The branch prediction mechanism 200 will place the branch address and predicted target address <BA, TA> of each predicted taken branch in the PBT 250 in First-In-First-Out (FIFO) order. Whenever a branch is decoded, the decode unit 2 (FIG. 2) uses the entries in the PBT 250 to determine if it was predicted to be a taken-branch (both branch address or target address) and the execution unit 5 (FIG. 2) will use the PBT 250 entries to determine if the action of a branch (taken or not taken) was correctly predicted.

As each branch is executed, if it was identified as a predicted taken branch (thus in the PBT 250), it is removed from the PBT 250. As long as the BHT 201 is correctly predicting the action of each future branch, the PBT 250 will include, (in FIFO sequence) the exact ordering of the taken branches encountered by the processor. If a taken branch is executed and not in the PBT 250, a branch prediction error has occurred.

Whenever a branch prediction error is detected, the entries in the PBT 250 are discarded. When a branch prediction error is detected, the instruction fetching mechanism 400 and branch prediction mechanism 200 are reset to begin at the appropriate address following the branch prediction error.

Referring to FIG. 6, actions of the instruction fetch mechanism 400 are illustratively shown. Note the instruction fetching mechanism 400 issues instruction fetches to the cache and then determines the appropriate next-instructionfetch address (either a next sequential fetch or the target address of a predicted branch). The instruction fetch address 410 is initially sent to the cache and then used to determine the 'next instruction address'. The instruction fetch address 410 is compared against the branch address (252) field (FIG. 5) of the next predicted taken branch included in the PBT 250. The entries in the PBT 250 represent a sequence of predicted taken branches. Each predicted branch then corresponds to a jump in the instruction stream that the instruction fetching mechanism 400 follows. Address compare logic 412 compares the instruction fetch addresses to the sequence of predicted taken branches to determine if a jump in the instruction fetching stream is necessary. If a match is found, signaled via path 420, then a jump in the instruction stream is anticipated. When this occurs, the next instruction fetch block is set equal to the target address of the matching PBT entry.

If no match is found, path 415, the next 'instruction fetch block' is set equal to the 'next-sequential' fetch. For example, if the last instruction fetch was for address 2000 and the instruction fetch width is 16 bytes, then the next instruction fetch is 2016. The sequence of instructions loaded into the instruction buffer 119 (FIG. 2) is a series of next sequential instructions up to a branch. If the branch is predicted as being taken, the instruction buffer 119 is then seamlessly followed (loaded) by the instruction located at the target of the branch or the next sequential instruction following the branch, if the branch is predicted as not taken.

To aid the instruction fetching mechanism 400 in fetching the proper sequence of instructions, the PBT 250 is indexed by a current-branch-pointer (CBP) 251. The CBP 251 is used to select the next entry in the PBT 250 that is used to match the current instruction fetch address. The CBP 251 is initially set to one, indicating the first entry in the PBT 250 is used to match the current instruction fetch block address. When a match occurs the CBP 251 is incremented by one to allow the next entry in the PBT 250 to be compared against future instruction fetch block addresses, and the next instruction fetch block is set equal to the target address of the matching PBT entry.

By incrementing the CBP 251 each time an instruction fetch block matches a PBT entry, the instruction fetching mechanism 400 can sequentially follow the path of instructions predicted by the branch prediction mechanism 200.

The following example will now explain the operation of the branch prediction mechanism 200 and instruction fetching mechanism 400. A program sequence that starts at address 1000 (in hex) and has three BHT entries representing three previously taken branches is considered. Let the three BHT entries be denoted as the following <BA, TA> pairs:

<1020, 1028>, <1032, 1050>, and <1064, 1090>.

That is, the first branch is located at location 1020 and branches to location 1028. The second branch is at location 1032 and branches to 1050. And, the third branch is at location 1064 and branches to 1090.

The branch prediction mechanism 200 begins at location 1000 and tries to determine the next taken branch the program will encounter. Assuming the BHT search width is 32 bytes (20 hex), then the initial BHT search address (at location 1000) will not detect any predicted taken branch. The branch prediction mechanism 200 will then set the next BHT search address to be 1020 (hex). This is illustrated in FIG. 4 via path 215.

The next BHT search (at address 1020 hex) will detect the first BHT entry <1020, 1028>. This entry will be saved in the PBT 250. The next BHT search address will be the target of the predict branch, this is address 1028, and is illustrated via path 220 of FIG. 4.

Continuing this process the next four BHT search addresses are 1028, 1050, 1060 and 1090. At the end of this process three BHT entries will be saved in the PBT 250. They are <1020, 1028>, <1032, 1050>, and <1064, 1090>.

In parallel, the instruction fetching mechanism 400 is issuing instruction fetches to the cache. Assume the instruction fetch width is 16 bytes, then the first instruction fetch is at location 1000 (hex). Since there is not a predicted branch included in I-fetch-block 1000 (hex), the next instruction fetch is 1010 (hex). This is illustrated via path 415 in FIG. 6. Each instruction fetch address is compared (in sequence starting from the top) against the predicted branch BHT entries saved in the PBT 250. Since the branch prediction search width is twice that of the instruction fetch width (32 bytes versus 6 bytes), the branch prediction mechanism 200 can detect the branch at location 1020 on the second cycle while the instruction fetching mechanism is only fetching the I-fetch-block at location 1010. Continuing, instruction fetch address 1010 will not detect any predicted branch and the next instruction fetch address will be 1020.

On the third cycle the instruction fetch address (1020 hex) will detect a match from the first BHT entry held in the PBT 250. This will cause the next instruction fetch address to be 1028, and is illustrated via path 420 of FIG. 6. Instruction fetch address 1028 will not detect a predicted branch (BHT entry) in the PBT 250 and the next instruction fetch address will be 1030. Instruction fetch address 1030 will detect a BHT entry in the second position of the PBT 250 and set the next instruction fetch address to 1050. Continuing this process the next 3 I-fetch-blocks are 1050, 1060, 1090.

Throughout this process, the PBT 250 is indexed by a current-branch-pointer 251 CBP (FIG. 6). The CBP 251 is used to select the next entry in the PBT 250 that is used to match the current instruction fetch address. For example, at the start of the instruction fetching sequence described above, the CBP 251 is initially set to one, indicating that the first entry in the PBT 250 (BHT entry <1020, 1028>) is being selected to match against the current instruction address. After instruction fetch address 1020 matches the branch address included in the first entry of the PBT 250, the CBP 251 is incremented by one and set to two, indicating the BHT entry held in the second position of the PBT 251 (BHT entry <1032, 1050>) is the next BHT entry to be used to match the current instruction fetch address.

By incrementing the CBP 251 each time an instruction fetch block matches a PBT entry, the instruction fetching mechanism 400 can sequentially follow the path of instructions predicted by the branch prediction mechanism 200.

Figure 7:
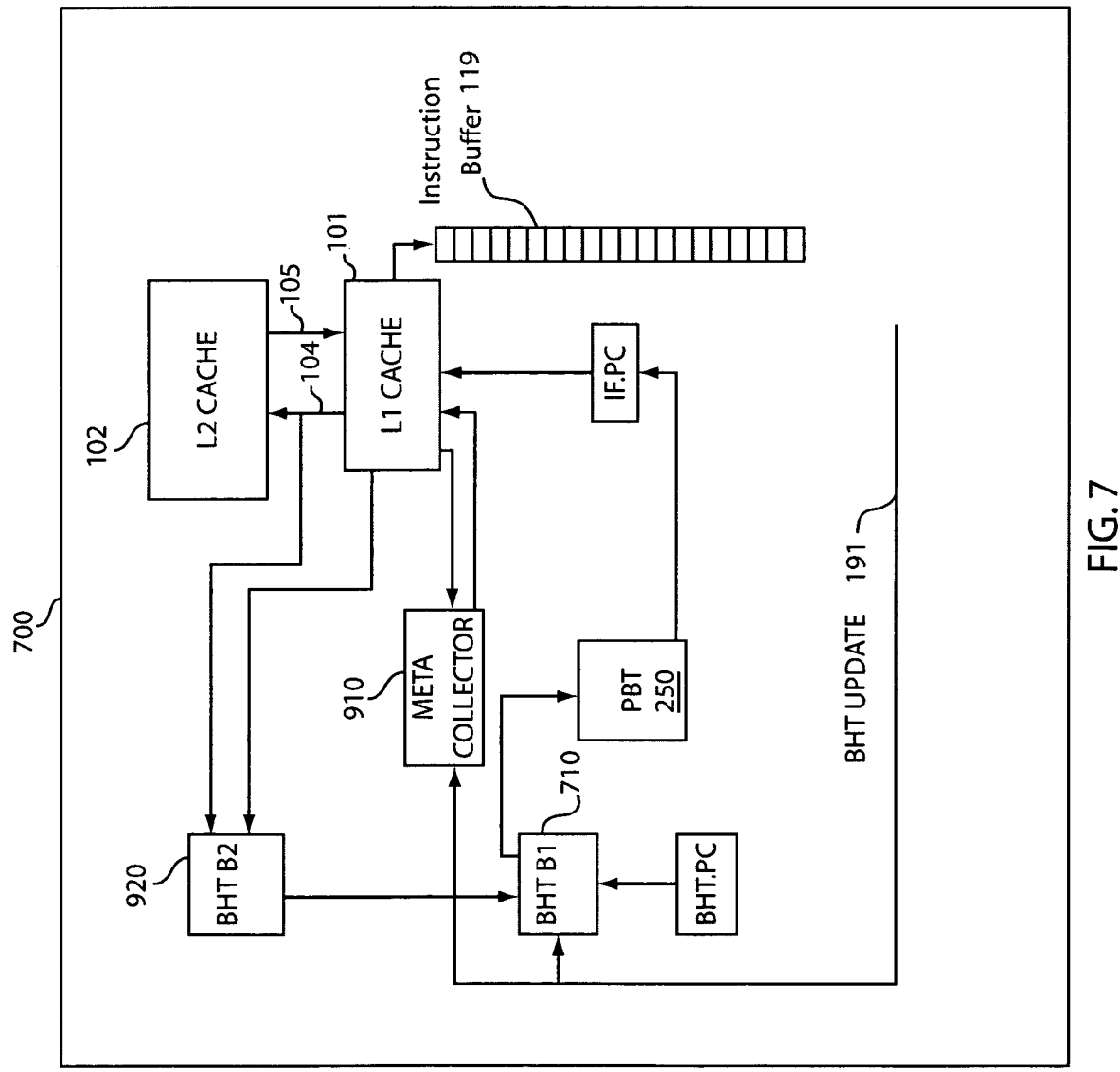
FIG. 7 is a functional block diagram of an instruction fetching mechanism with context look ahead for BHT.

Referring to FIG. 7, the structure and operation of a Context Look Ahead BHT system 700 in accordance with the present invention is illustratively shown. One aspect of this invention is to assemble branch prediction information in a Meta collector and associate this information with a cache line that currently resides in the L1 cache. This branch prediction information identifies BHT entries that were recently referenced after the cache line was referenced. When the cache line is evicted from the cache (replaced), the assembled branch prediction information will be sent to a backing store. This backing store can be the L2 or a second level BHT. When the cache line is re-referenced and brought back into the cache, the associated branch prediction information will be prefetched and brought back into the BHT.

Figure 2:
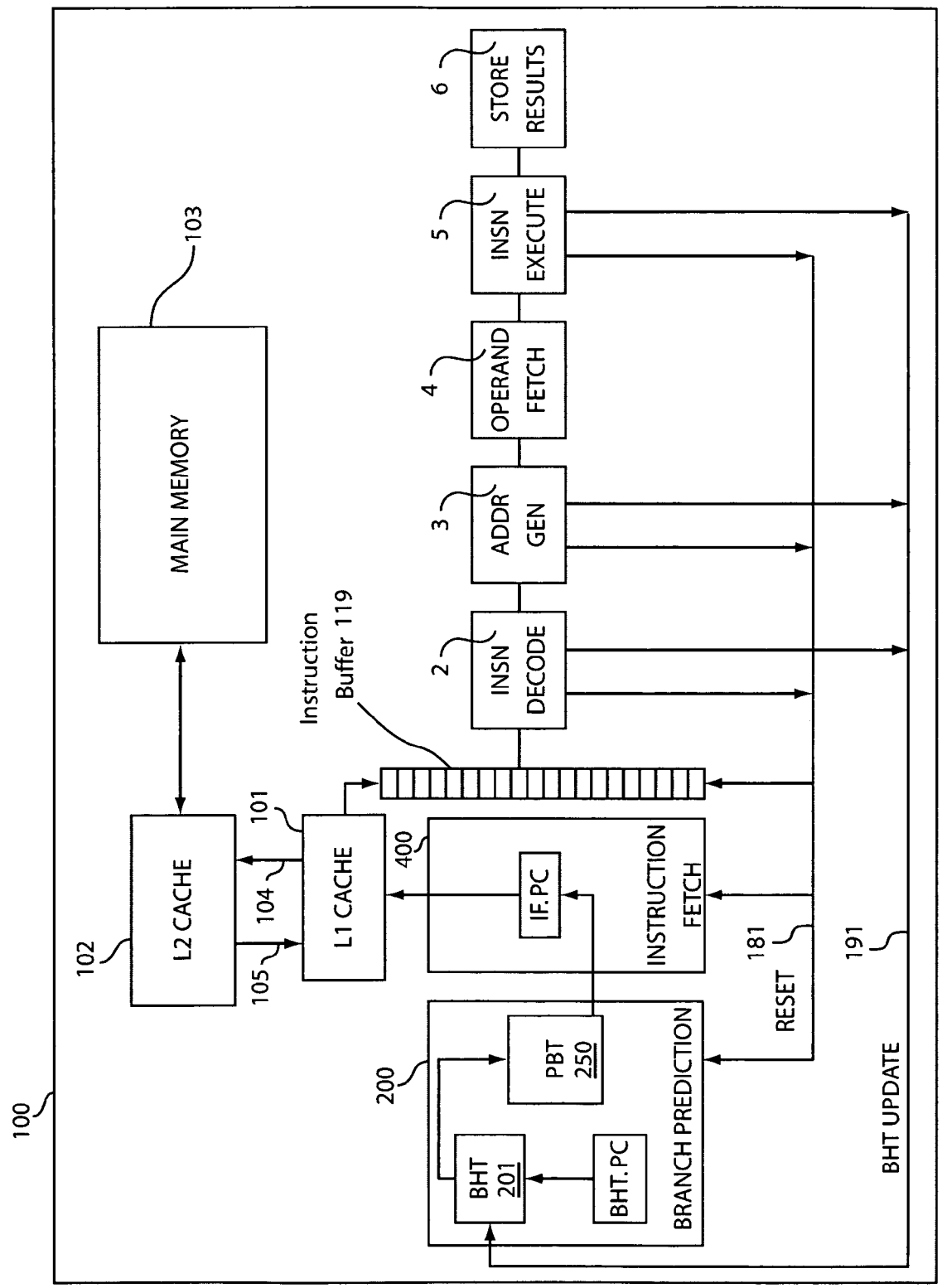
FIG. 2 is a functional block diagram of a decoupled instruction fetch engine.

The BHT system 700 includes a small and fast BHT (B1) 710 which may be similar in structure to the branch history table 202 (FIG. 2). A second level BHT (B2) 920 includes a large table and is used to store the Context Look Ahead branch information. For example, to facilitate a fast access (cycle) time, the B1 can contain 1K TO 2K entries while the second level BHT may include 8K to 32K entries. The prefetching action between the B2 and B1 allows a small/fast first level BHT to appear to have the hit ratio (successful prediction rate) of a much larger BHT. If the prefetching is timely then the B1 can appear to have the hit ratio of a BHT that is the size of the B2 and overall system performance will be increased.

The B1 BHT 710 contains the most recently referenced branch prediction information. That is, it contains branch prediction information that is needed to predict branches that are currently in the first level cache 101. In addition, the B1 BHT contains branch prediction information needed to predict branches that currently are not in the cache but will be brought into the cache by a miss in the near future. A second level BHT (B2) 920 is used to restore the LAC information in the B1 when a cache line is transferred from the L2 cache 102 to the L1 cache 101.

The operation of prefetching the relevant information from the second level 102 to the first level 101 is described in four parts:

1. Collecting the Look Ahead Context (branch prediction information) associated to an L1 cache line.
2. Writing the Look Ahead Context into L1 cache.
3. Writing the Look Ahead Context into the B2 when the cache line gets evicted from L1.
4. Writing the Look Ahead Context (branch prediction information) associated with the L1 miss address into the B1. This happens during a L1 miss and corresponds to prefetching the branch prediction information into the B1.

Collecting the Look Ahead Context

Figure 8:
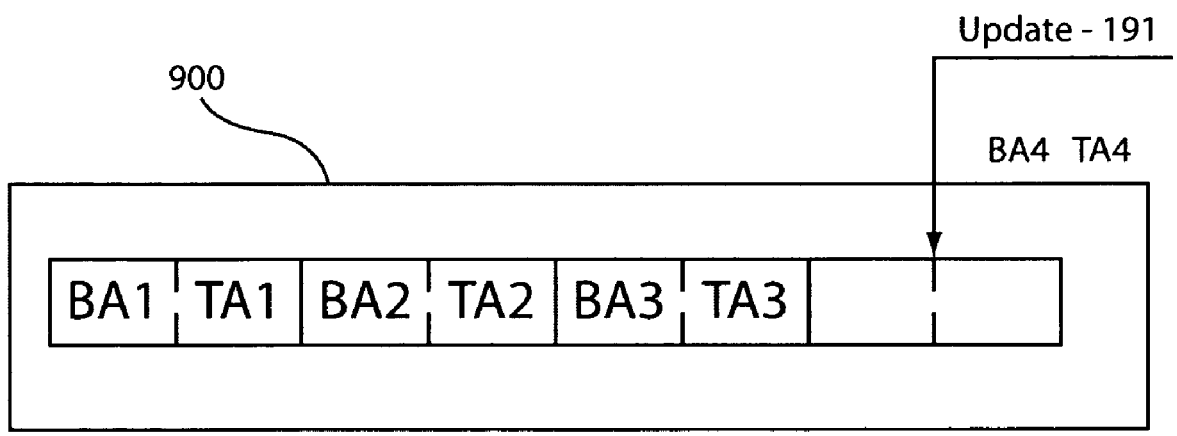
FIG. 8 illustratively shows a structure for Look Ahead Context (LAC) for branch information saved in a Meta-Collector.

Referring to FIG. 8 with continued reference to FIG. 7, the Look Ahead Context (LAC) for branch information corresponding to an L1 cache line is shown. The entries in the Look Ahead Context 900 correspond to distinct BHT entries and are ordered with respect to time. The number of BHT entries in the Look Ahead Context, also referred to as Context Look Ahead Depth, is a design parameter which is set according to the type of Meta-structure. For this example, a depth of four BHT entries per LAC is provided for illustrative purposes. The branches BA1, BA2, BA3, and BA4, in the example, may belong to different cache lines or may be part of a single cache line.

The mechanism which collects the LAC information associated with a cache line is called a Meta-Collector circuit 910 (FIG. 7). Many designs are possible for the Meta-Collector 910. The one shown here is chosen for simplicity of exposition.

Figure 9:
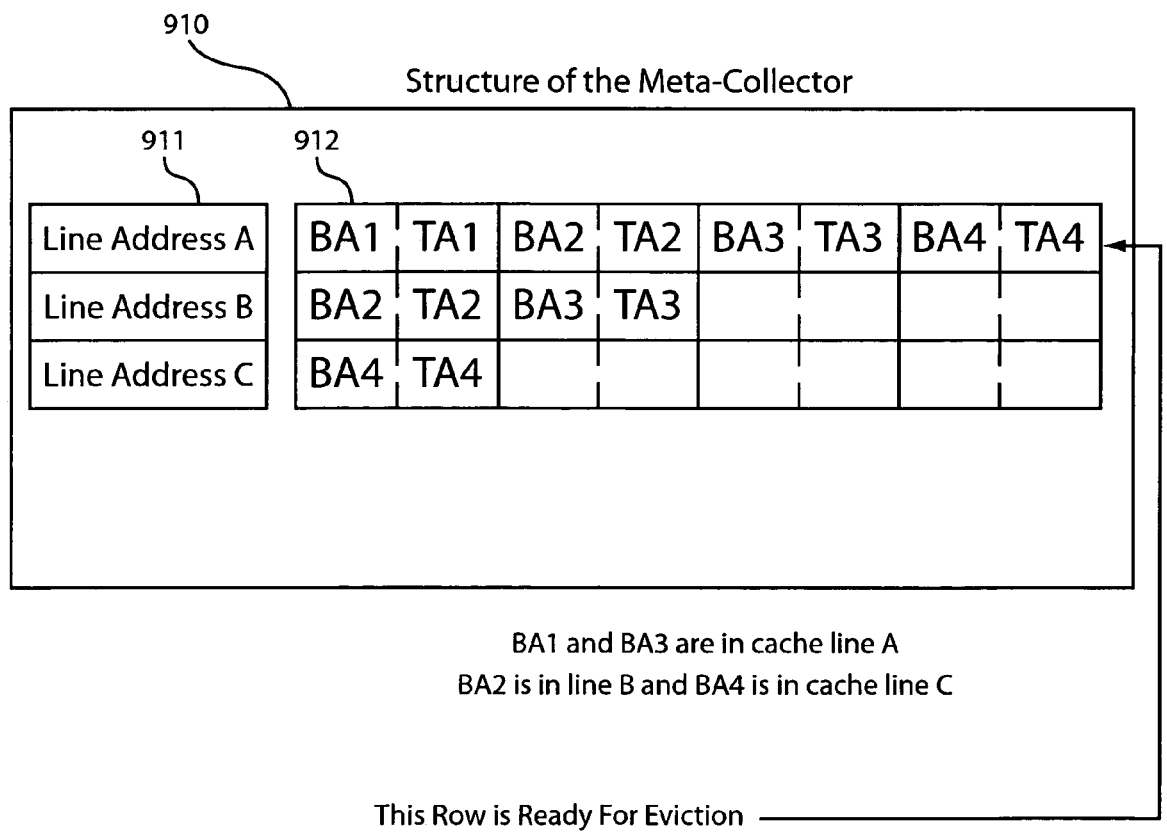
FIG. 9 illustratively shows the structure of a Meta-Collector.

Referring to FIG. 9, the organization of the Meta-Collector 910 is shown. The Meta-collector contains three rows (corresponding to three LACs), where each row includes branch prediction information associated with a cache line. There are four BHT entries per LAC (depth=4). Each row of the Meta-Collector 910 includes a cache line address (911) and up to 4 <branch address, target address> pairs (912). For example, FIG. 9 shows three cache line addresses (line address A, B, and C). Each line address 911 corresponds to the address of a cache line that was most recently referenced. The corresponding branch address and target address information that follow the creation of the cache line in the Meta-Collector 910 are shown in the branch information fields 912.

Figure 10:
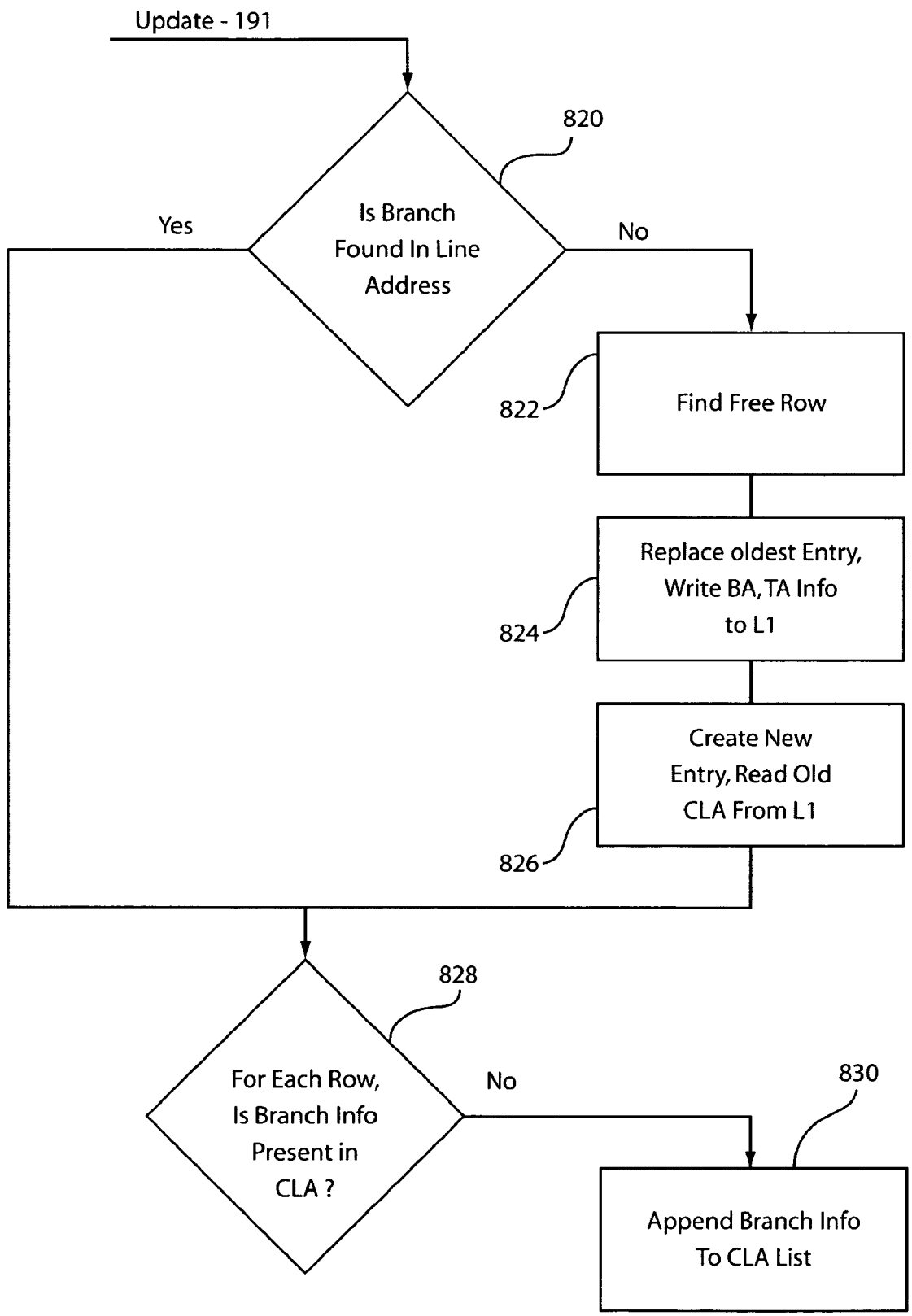
FIG. 10 is a functional block diagram for storing the LAC in Meta-Collector.

Referring to FIG. 10, an operation for storing the LAC information is shown. When a new branch is encountered, (is part of a BHT update) the branch and target address information are sent to the Meta-Collector 910 via path 191 (for example Branch BA1 in FIG. 9). Each row of the Meta-Collector 910 is searched, in block 820, to determine if the cache line including the branch address is currently in the Meta-Collector 910. The cache line address fields 911 are compared to the address of the cache line including the branch. If no match is found (a miss), a new entry is made in the Meta-Collector 910, in block 826, after finding a free row, in block 822 and replacing the oldest entry in block 824.

When a miss occurs, the Meta-Collector 910 replacement algorithm chooses an entry for replacement. There are many replacement algorithms to select which entry (row) the Meta-Collector 910 will be replacing. One algorithm chosen here for simplicity of exposition includes choosing the oldest entry. The oldest entry in the Meta-Collector 910 is chosen for replacement in block 824. Once the line is chosen for replacement, the existing branch and target address information (BHT entries) of the replaced entry are copied to L1 cache line with the same address (block 824).

After the old branch information is saved in the L1, a new entry is made in the Meta-Collector 910, in block 826. The cache line address for the new entry (911) is set equal to the address of the cache line that contains the new branch and the branch and target address information for the branch are saved in the branch information fields (912). It is noted, the L1 cache directory is also modified to include branch prediction information associated with each cache line it includes. For example, a cache directory includes a valid bit, tag information (address of line), and any previously identified LAC information <valid, tag, LAC>. Thus, when a miss occurs, the L1 cache is also searched to determine if there is any branch and target information associated with the cache line address just entered into the Meta-Collector 910. This permits branch prediction information associated with a cache line to exist simultaneously in the cache and Meta-Collector. If the L1 cache includes existing branch/target information, this information is also copied into the new entry saved in the Meta-Collector (if space is available).

If the cache line including the new branch already exists in the Meta-Collector 910, only the branch and target information need to be saved in the branch information fields (912) of the existing entries. In block 828, each row of the Meta-Collector 910 is searched to determine if the branch and target information is already saved in the branch information field. If the information already exists, no action is necessary. However, if the branch and target information is not in an existing row, a new <BA, TA> entry is made irrespective of whether the branch belongs to the same cache line or not (if space is available) in block 830. If no space is available, (all entries include valid <BA, TA> pairs) the oldest entry is replaced. It is noted that there are many policies to identify a LAC entry to discard when all are valid. For example, used bits can be added to the LAC to identify the least recently used (LRU) entry. In this case, the LRU can be chosen for replacement. However, the LAC entries are maintained as a FIFO stack and the oldest entry can be easily be identified and discarded when it is necessary to make room for the new entry.

Note, in FIG. 9 branches BA2, BA3, and BA4 are added to the Meta-Collector entry beginning with branch BA1. However, branches BA2 and BA4 do not belong to the same cache line as the branch BA1. Note also that for each new branch encountered, the above procedure is followed to update the Meta-information collector.

Just as the cache includes spatial and temporal information regarding the memory references of a program, the LAC includes both spatial and temporal branch prediction information used by a program. The information is spatial in that it collects branch prediction information included within a cache line. The information is temporal in that a branch that is recently used has a high probability that it will be used again to predict the outcome of a branch.

Writing the LAC in L1 Cache:

When an entry gets evicted out of the Meta-Collector 910 (block 824 of FIG. 10), the LAC information associated with the replaced line gets written into L1 cache directory. That is, the cache directory is written to reflect the branch prediction information associated with that line <valid, tag, LAC>. Note the implementation could also include writing the entries evicted out of the Meta-Collector 910 to a separate structure or directly to the L2 cache or BHT B2. The method disclosed herein preferably does not need additional hardware (for a separate structure), or cause any increase in bus traffic (for directly updating L2 cache).

The branch LAC information associated with a cache line can go back and forth between the cache and Meta-Collector several times before being written to backing store. This allows each L1 cache line to accumulate the maximum amount of branch prediction information before being written to backing store.

Writing the LAC to the Secondary Storage

The next step is to save the LAC to a secondary storage when the information is no longer needed. This transfer to the B2 is triggered whenever an L1 miss occurs. On an L1 cache miss, the least recently used line (LRU) may be chosen for replacement. When this occurs, any branch prediction information (LAC) associated with the replaced line is written to backing storage. The new line is then written over the line just replaced.

Figure 11:
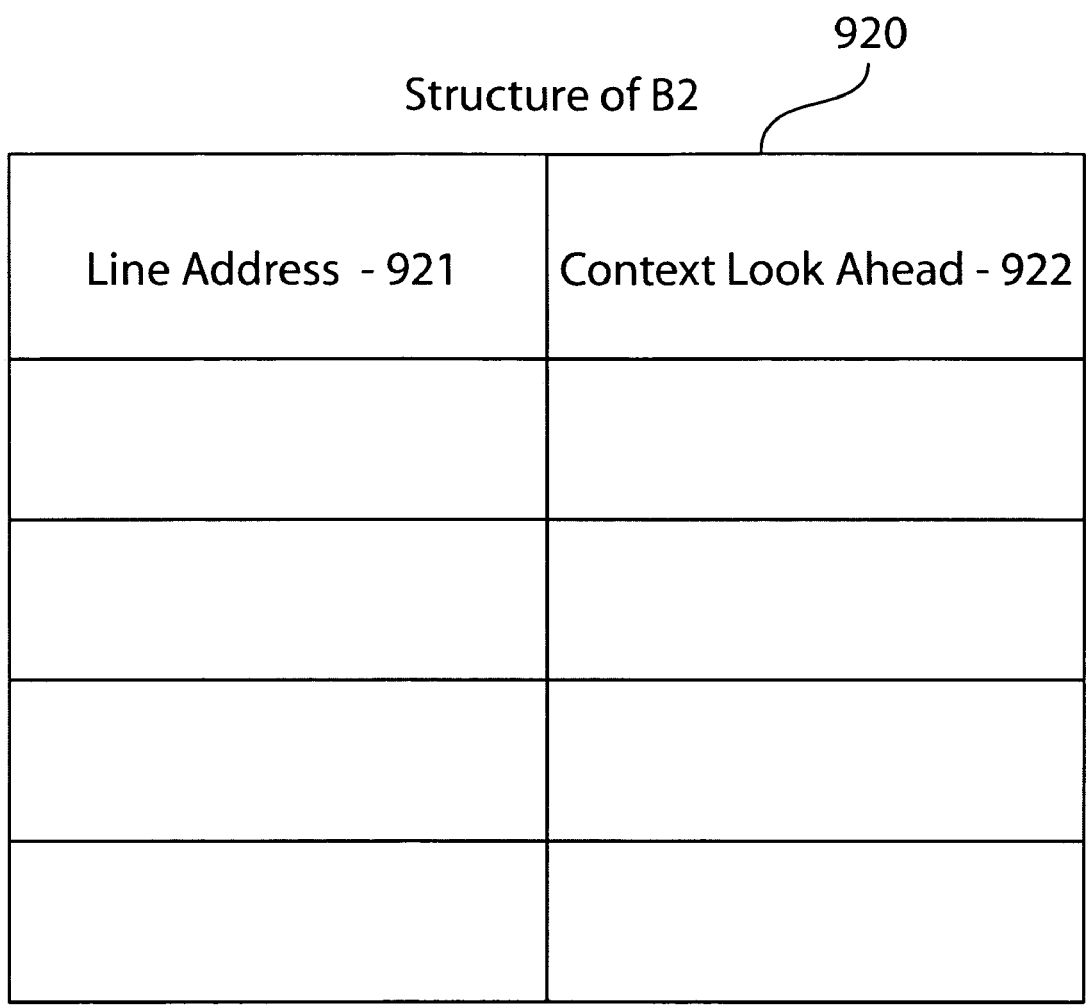
FIG. 11 illustrates a structure for a second level BHT (e.g., B2)

Referring to FIG. 11, the structure of a second level BHT-B2 920 is shown. The B2 structure includes the L1 line addresses 921 and corresponding Look Ahead Context (LAC) information 922. The second level BHT is indexed using the L1 line address. If there is a match, the LAC is replaced by the current LAC. If there is no match, a new entry is created with the LAC. When creating a new entry an invalid entry is filled, if present. If there are no invalid entries, the least recently used (LRU) entry of the second level BHT 920 is replaced with the new entry.

Figure 12:
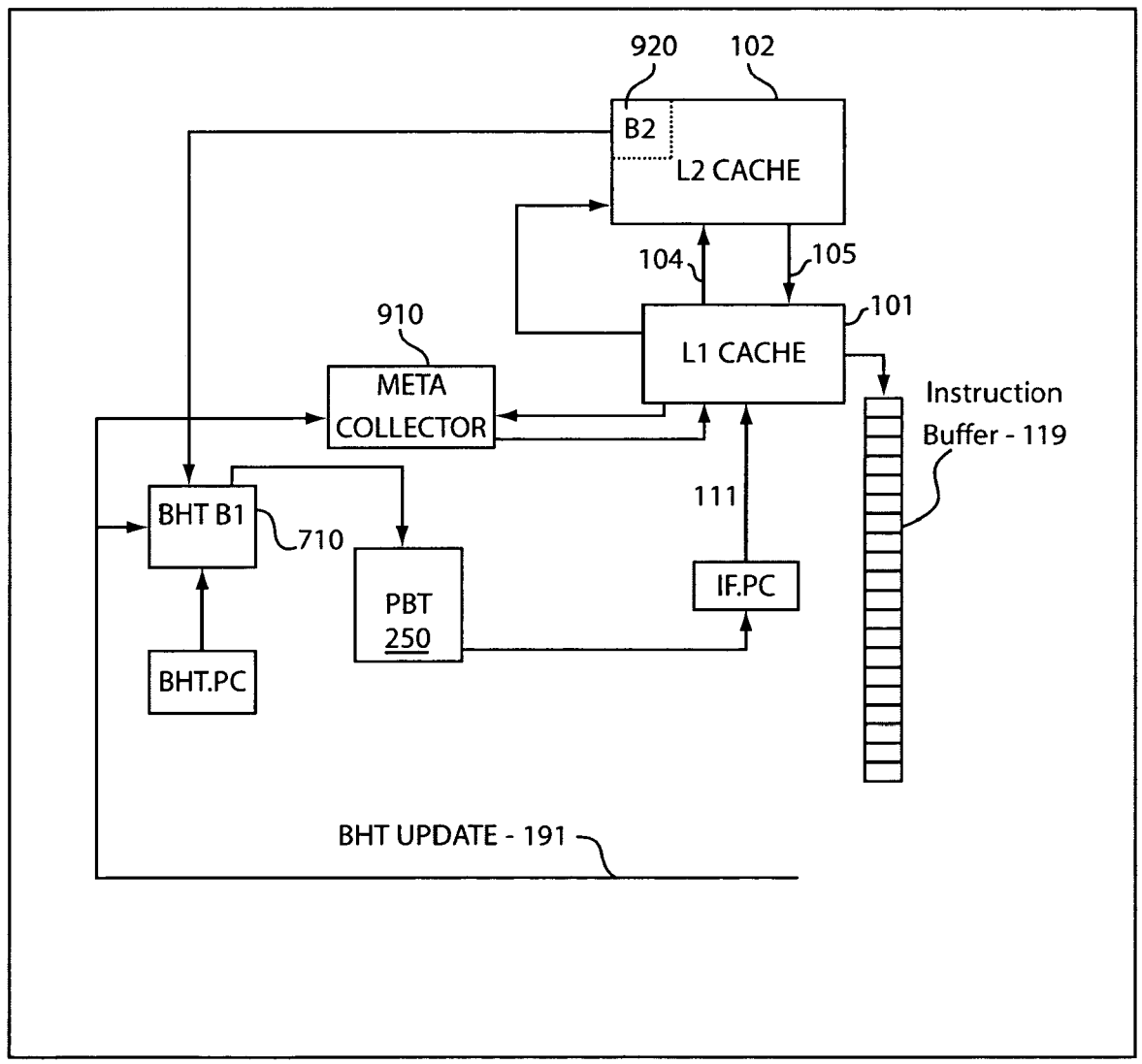
FIG. 12 is a functional block diagram including a Meta-Collector circuit.

The above implementation of B2 is chosen for illustrative purposes only. The contents of B2 920 (shown illustratively in cache 102) can be integrated to be part of the L2 cache structure as shown in FIG. 12. In this case, the contents of the L2 cache line also include the LAC. Hence, the LAC is brought to the first level BHT 710 whenever a line is loaded from the L2 cache to the L1 cache.

Restore LAC Corresponding to L1 Miss Address in B1

The prefetch from B2 920 to B1 710 is initiated whenever a cache line is transferred from L2 102 to L1 101. On an L1 miss, the L1 sends the miss address to the L2; this miss address is also transmitted to B2 920. The B2 is searched to determine if the line address associated with the miss is included in the B2. If a match occurs, (a hit) the B2 920, in response, transfers the Look Ahead Context information associated with the L1 miss address to the B1 710. Thus the relevant Look Ahead Context is restored in B1 710.

As mentioned above, the LAC contains both spatial and temporal information regarding the branch prediction information used by a program. This information is assembled in the Meta-Collector and associated with a cache line. By assembling the relevant branch prediction information in the LAC and prefetching it into the B1 during a cache miss, the BHT includes branch prediction information for branches that are included in the line currently referenced as well as branches that will be used in the near future. This feature allows the BHT to successfully predict the outcome of a branch (either taken or not taken) that is not even in the L1 cache.

Writing the branch information for the next "Look Ahead depth" BHT entries enables implicit prefetching of entries to the first level BHT 710 from the second level BHT 920 to occur. For example, with an LAC depth of 4, up to four first level BHT entries are filled from the second level BHT on every L1 cache miss. Similarly, filling a first level BHT entry can trigger prefetching of the successive L1 cache lines. For example, in FIG. 10, the branches BA1, BA2, and BA4 belong to different cache lines. Hence, filling the first level BHT 710 with this LAC leads to prefetching three L1 cache lines in a timely fashion.

As described with reference to FIG. 2, the branch prediction mechanism 200 is ahead of the instruction fetching mechanism 400 which is, in turn, ahead of the decode mechanism 2. Thus, prefetching L1 cache lines based on this scheme brings the data into the cache sufficiently ahead of time; thereby, hiding the memory access latency.

Operation of Prefetching Using CLASS

Figure 13:
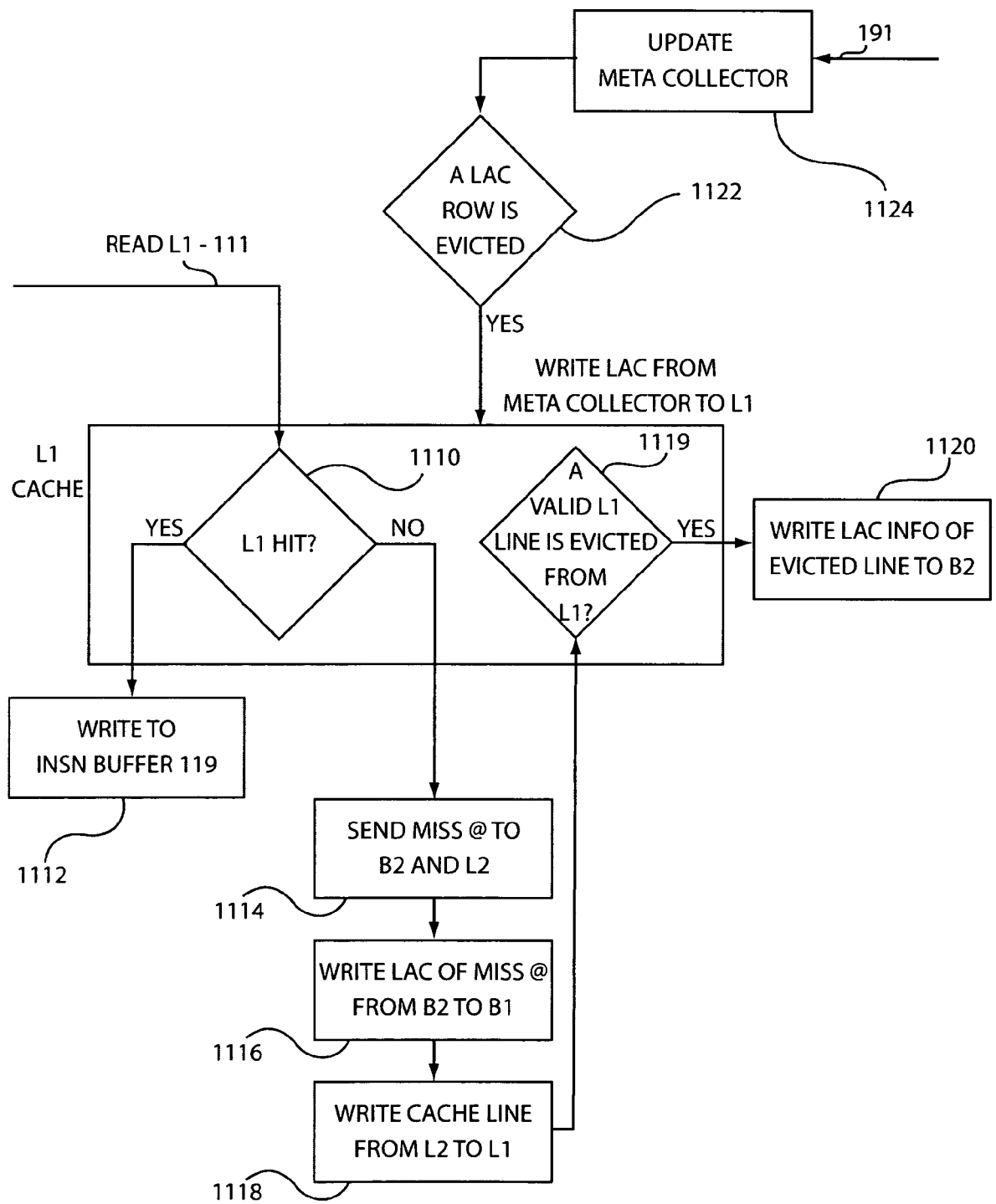
FIG. 13 is a functional block diagram of CLA-BHT in which the second level is integrated within L2 cache.

Referring to FIG. 13, the working of CLASS as applied to BHT is illustratively shown. The path 191 updates the Meta-Collector entries as explained with reference to FIG. 10, in block 1124. If a row of the Meta-Collector is evicted in block 1122, the entry is saved in the corresponding line of the L1 cache 101.

If the L1 cache access (path 111 in FIG. 13) results in a cache hit in block 1110, the instructions are written to the instruction buffer (119) in block 1112. If the L1 cache access produces a miss, the address of the miss is sent to the second level BHT (B2) and to the L2 cache in block 1114. The LAC information associated with the miss is sent from B2 to B1 (prefetched) in block 1116, and the cache line is loaded from L2 to L1 cache in block 1118. If a valid line is evicted from the L1 (to make room for the miss) and it has branch prediction information (LAC information) as shown in block 1119, the replaced LAC information is written to the B2 in block 1120. Note that this is a general purpose scheme and can be applied to any storage structure in which the accesses are highly correlated to the program control flow and tagged to instruction cache lines of the program.

Figure 14:
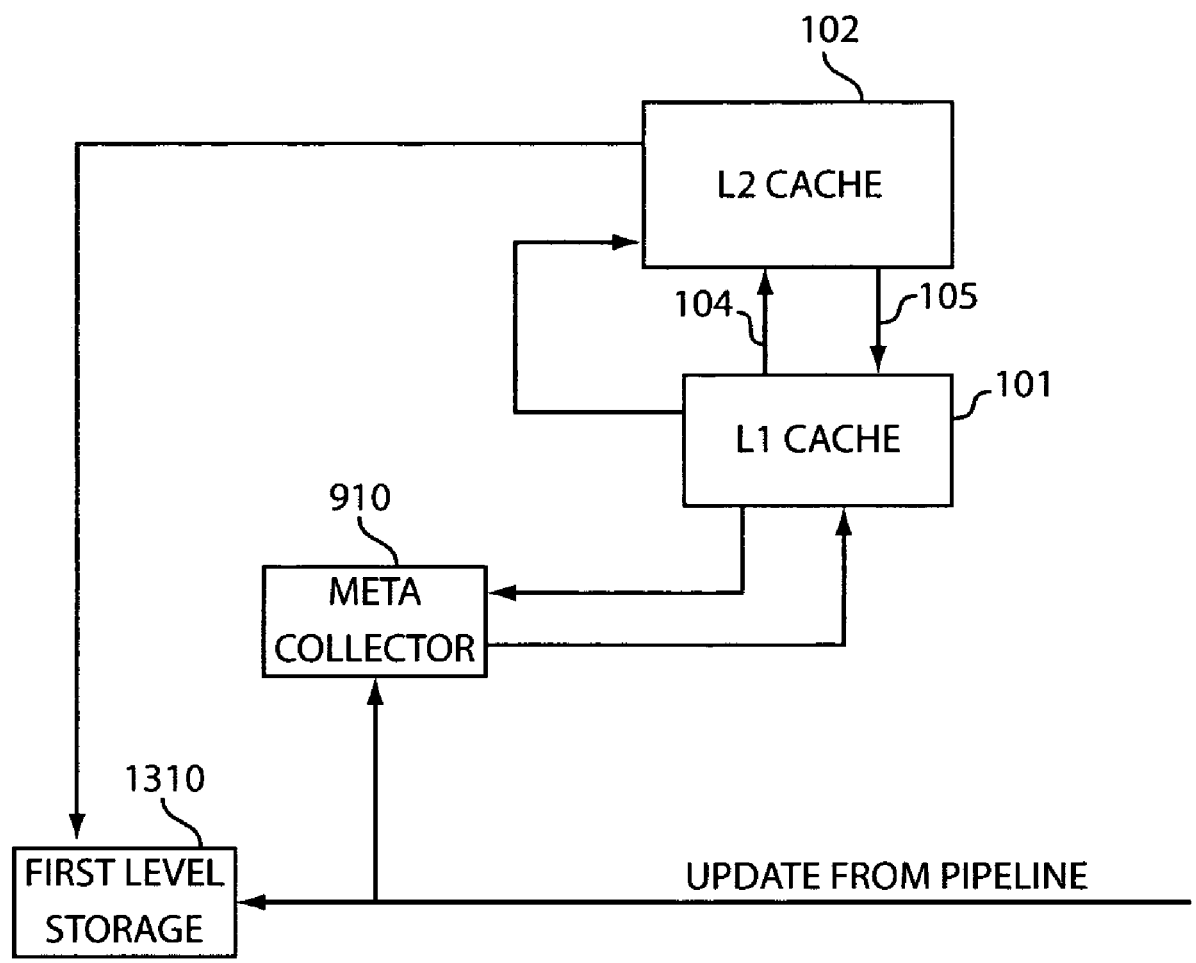
FIG. 14 is a functional block diagram of a CLA technique illustratively applied to any Meta-structure.

Referring to FIG. 14, a functional diagram of a CLASS scheme is shown in accordance with one embodiment of the present invention. The LAC information will depend on the type of predictor and type of information saved in the Meta-Collector. For example, the Instruction TLB (translation Look-aside Buffer) can be partitioned into a small/fast structure (T1) backed up a larger structure (T2). In FIG. 14, a first level storage 1310 corresponds to T1, while the T2 is included in L2 cache.

Translation information can be assembled in a Meta-Collector (block 910) whenever a pipeline update is detected. The TLB information can be assembled in a Meta-Collector and tagged to an L1 cache line just as branch prediction information was associated with an L1 cache line. The operation of copying the translation information from the T1 to the second level storage (L2) is similar to saving the branch prediction information in the B2 whenever a cache miss occurs. Also, the action of prefetching the translation information back into the T1 on a cache miss is similar to that described above with reference to FIGS. 7 through 12.

Figure 15:
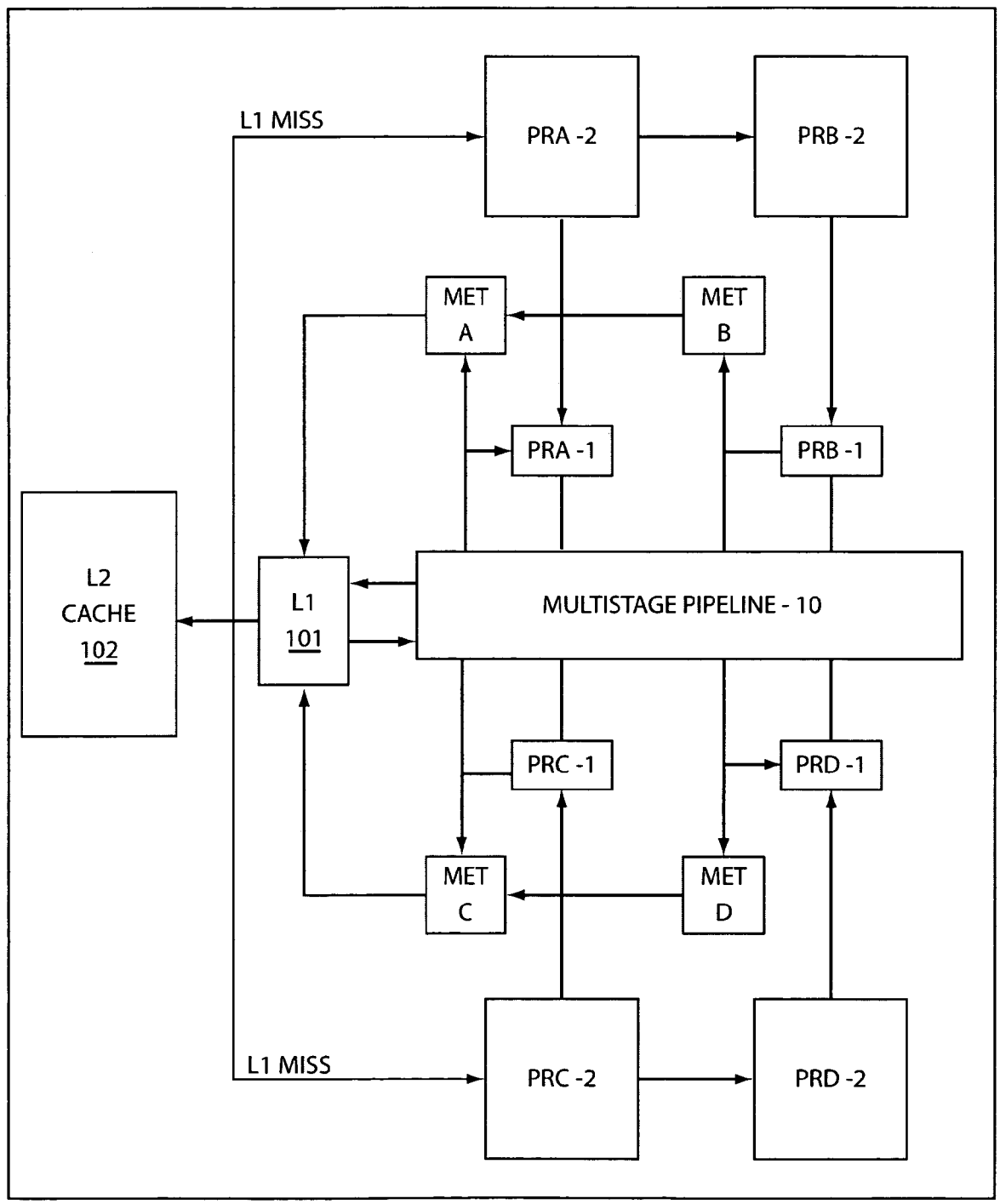
FIG. 15 is a functional block diagram in which the CLA technique is applied concurrently to different Meta-structures.

This scheme can also be used concurrently for different structures. For example, referring to FIG. 15, each structure may be arranged in a hierarchical manner and a relevant Meta-Collector circuit (e.g., 910) labeled Met A-D is used to collect the LAC. The LAC is transferred from the second level to the first level on a L1 cache miss. FIG. 15 shows one such scheme in which four structures, PRA, PRB, PRC and PRD, are concurrently using the Context Look Ahead scheme to prefetch entries from a bigger table (-2 designated blocks) to a smaller and faster table (-1 designated blocks) for a multistage pipeline 10. Other structures with different numbers of hierarchical circuitry may also be employed.

Having described preferred embodiments for context look ahead storage structures (which are intended to be illustrative and not limiting), it is noted that modifications and variations can be made by persons skilled in the art in light of the above teachings. It is therefore to be understood that changes may be made in the particular embodiments of the invention disclosed which are within the scope and spirit of the invention as outlined by the appended claims. Having thus described the invention with the details and particularity required by the patent laws, what is claimed and desired protected by Letters Patent is set forth in the appended claims.

What is claimed is:

1. A memory storage structure, comprising:
   at least one memory storage device;
   a first meta-structure having a first size and operating at a first speed, which is faster than a second speed for storing meta-information based on information stored in a memory;
   a second meta-structure hierarchically associated with the first meta-structure, the second meta-structure having a second size larger than the first size and operating at the second speed such that faster and more accurate prefetching is provided by coaction of the first and second meta-structures; and
   a meta-collector configured to collect and record look ahead context information in the meta-information which includes at least one of spatial and temporal state information associated with access of entries in a meta-structure and a memory location, such that the meta-collector provides prefetching of history table entries to the first meta-structure based upon the look ahead context information.

2. The structure as recited in claim 1, wherein the first and second meta-structures include branch history tables and the meta-information includes branch history data.

3. The structure as recited in claim 2, further comprising a predicted branch table for identifying a sequence of predicted taken branches that a processor will soon encounter.

4. The structure as recited in claim 1, wherein the meta-information includes temporally sequential information that is likely to be used in the near future.

5. The structure as recited in claim 1, wherein the meta-information includes spatially sequential information that is likely to be used in the near future.

6. The structure as recited in claim 1, wherein the meta-information is correlated to program flow in a processor.

7. The structure as recited in claim 1, wherein the at least one memory storage device includes a cache.

8. The structure as recited in claim 7, wherein at least one of the meta-structures are incorporated in the cache.

9. The structure as recited in claim 7, wherein the cache is hierarchically arranged.

10. The structure as recited in claim 9, wherein the hierarchically arranged cache includes a first level cache line and a second level cache line.

11. The structure as recited in claim 1, wherein the meta-information includes at least one of a branch address (BA) and a predicted target address (TA) for information to be prefetched.

12. A method for prefetching meta-information, comprising the steps of:
   providing a memory storage structure having a cache, meta-structures hierarchically arranged in accordance with size and speed, and a meta-collector which collects and records one of temporally and spatially sequentially unique meta-information related to access of entries of a meta-structure and corresponding cache lines;
   prefetching meta-information for storage in the meta-structures such that improved speed is provided by coaction of hierarchical meta-structures; and updating meta-information between levels of the hierarchical meta-structures, wherein the step of updating includes updating meta-information by copying the meta-information between a level of a cache and a level of a branch history table.

13. The method as recited in claim 12, wherein the step of prefetching includes associating cache lines with information addresses in the meta-collector.

14. The method as recited in claim 12, wherein the meta-structures include branch history tables and the meta-information includes branch history data.

15. The method as recited in claim 12, further comprising the step of identifying a sequence of predicted taken branches that a processor will soon encounter by employing a predicted branch table.

16. The method as recited in claim 12, farther comprising the step of correlating the meta-information to program flow in a processor.

17. The method as recited in claim 12, further comprising the step of evicting cache line information from the meta-collector when a corresponding cache line is replaced.

18. The method as recited in claim 12, further comprising the step of storing evicted information to a next level memory area in a cache hierarchy.

19. The method as recited in claim 12, further comprising the step of on a cache miss, writing to a next level memory area in a cache hierarchy, a cache miss address.

20. The method as recited in claim 12, wherein the step of updating includes updating meta-information by copying the meta-information between a first level of a meta-structure and a second level of a meta-structure.

21. The method as recited in claim 12, wherein the step of updating includes updating meta-information by copying the meta-information to/from a meta-collector.

22. The method as recited in claim 12, further comprising the step of accumulating meta-information by transferring the meta-information between entities such that new meta-information is added upon each transfer.

23. A method for processing a temporal sequence of events, wherein the events have spatial context, the method comprising the steps of:

capturing a set of entries in a meta-structure in temporal order, the entries including information associated with each entry;

storing sub-sequences of temporal entries, which share spatial context as monolithic entities wherein each monolithic entity is associated with a particular spatial context; and when a new spatial context is encountered in the temporal sequence, creating a new monolithic entity associated with the new spatial context, the new spatial context including a temporal sub-sequence of events now associated with the new spatial context.

24. The methods as recited in claim 23, further comprising the step of storing the monolithic entities associated with the spatial contexts in their temporal order of occurrence.

25. The method as recited in claim 23, wherein the monolithic entities include multi-dimensional data.

26. The method as recited in claim 25 wherein one of the multi-dimensions includes a spatial dimension.

27. The method as recited in claim 25 wherein one of the multi-dimensions includes a temporal dimension.

28. The method as recited in claim 25 wherein one of the multi-dimensions includes metadata.

29. The method as recited in claim 23 wherein the information includes metadata.

30. The method as recited in claim 23, further comprising: storing the monolithic entities at a location determined by spatial context of the monolithic entities.

31. The method as recited in claim 23, further comprising: storing the monolithic entities at a location determined by temporal context of the monolithic entities.

32. The method as recited in claim 23, further comprising: retrieving monolithic entities from storage in accordance with spatial content of the said monolithic entities.

33. The method as recited in claim 32, further comprising: using metadata associated with the monolithic entities by a processor after the monolithic entities are retrieved.

34. The method as recited in claim 23, further comprising: retrieving monolithic entities from storage in accordance with temporal content of the said monolithic entities.

35. The method as recited in claim 34, further comprising: using metadata associated with the monolithic entities by a processor after the monolithic entities are retrieved.

36. A method of prefetching meta-information, comprising the steps of:

providing a memory storage structure having a cache, meta-structures hierarchically arranged in accordance with size and speed, and a meta-collector which collects and records one of temporally and spatially sequentially unique meta-information related to access of entries of a meta-structure and corresponding cache lines;

prefetching meta-information for storage in the meta-structures such that improved speed is provided by coaction of hierarchical meta-structures;

updating meta-information between levels of the hierarchical meta-structures, wherein the step of updating includes updating meta-information by copying the meta-information between a first level of a cache and a second level of a cache.

* * * * *